Patented Oct. 27, 1936

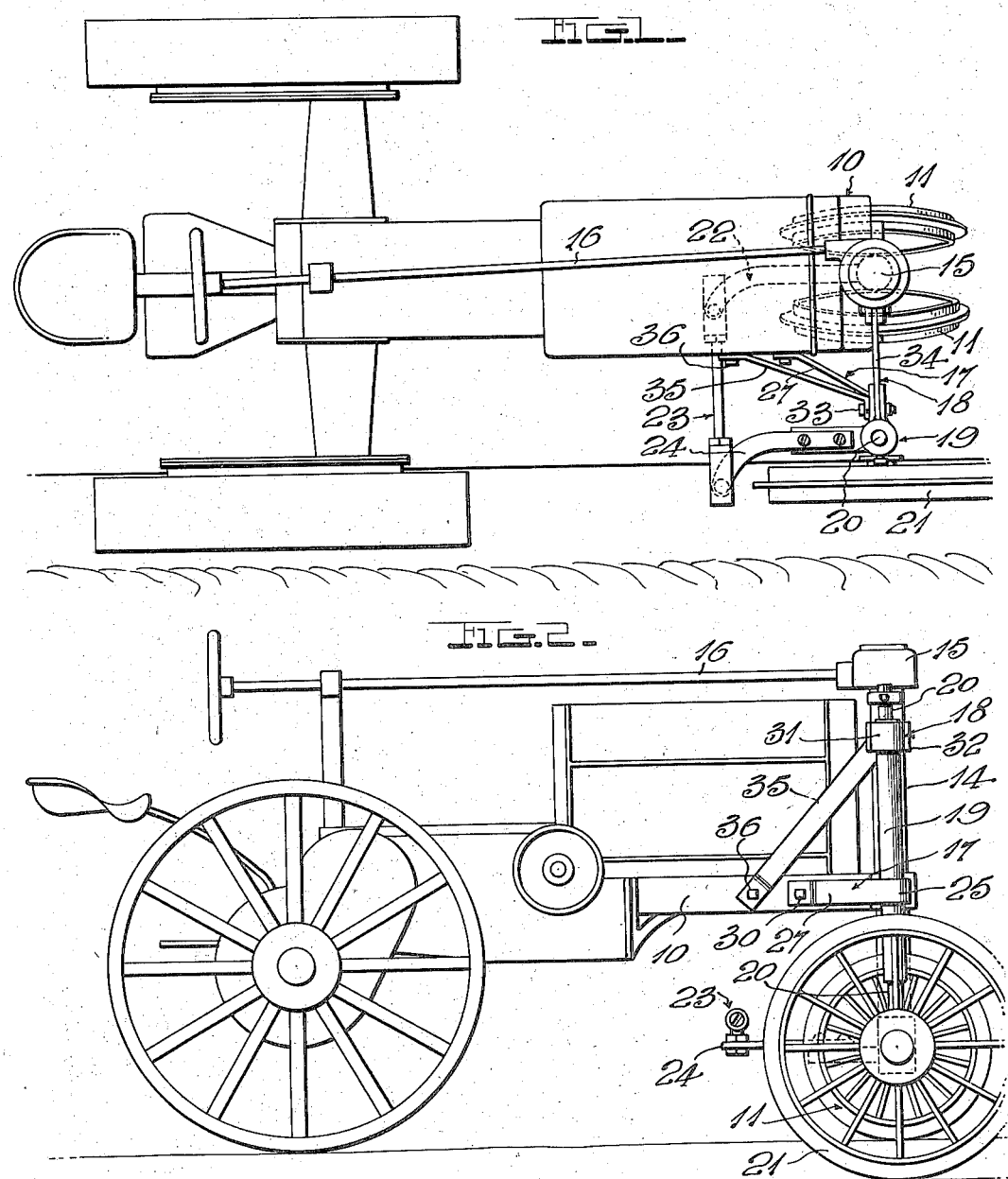

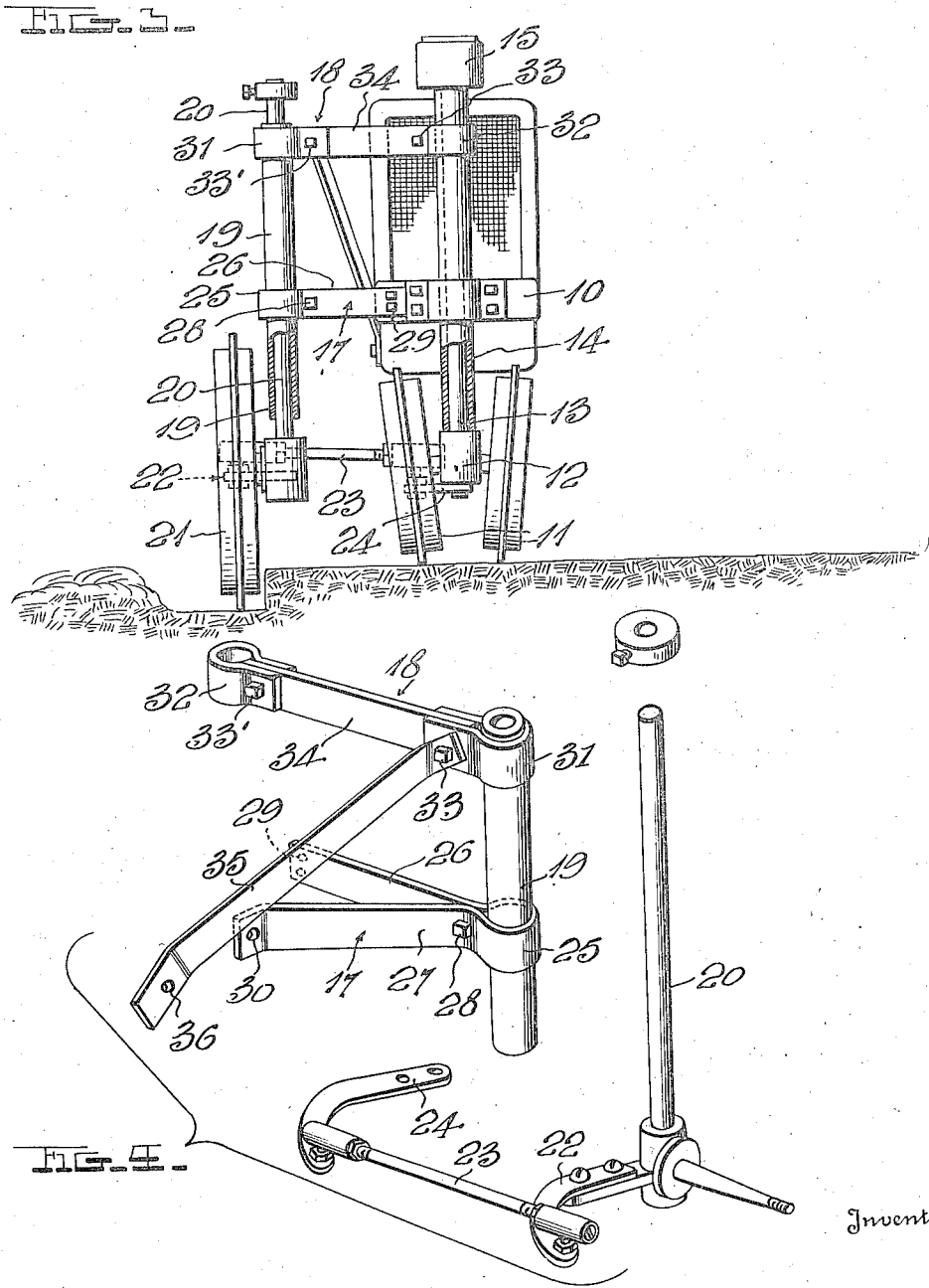

2,059,140

UNITED STATES PATENT OFFICE 2,059,140

TRACTOR GUIDE

William Oldendorf, Rushford, Minn.

Application June 26, 1936, Serial No. 87,538

8 Claims. (Cl. 97—49)

The invention aims to provide exceptionally simple and inexpensive, yet efficient and practicable means to materially aid the driver of a tractor in properly steering the same when plowing. The comparatively small and light general purpose tractors of today are often provided with a central wheel or wheels at the front, neither of which travels in the furrow when plowing, with the result that the driver experiences great difficulty in maintaining the tractor in proper relation with the furrow, but due to the present invention such difficulty is overcome.

With the foregoing in view, the invention resides in the novel subject matter hereinafter described and claimed, description being accomplished by reference to the accompanying drawings.

Figure 1 is a top plan view of a tractor equipped with the invention.

Figure 2 is a side elevation.

Figure 3 is a front elevation partly in section.

Figure 4 is a disassembled perspective view showing a number of the parts of the attachment.

The preferred construction has been shown and will be rather specifically described, with the understanding however, that within the scope of the invention as claimed, variations may be made.

A conventional general purpose tractor is shown including the usual frame 10, closely related front wheels 11, front axle 12, steering shaft 13 connected with and rising from said axle, fixed vertical tube 14 in which the shaft 13 is mounted, casing 15 at the upper end of said tube containing gearing, and hand-rotated shaft 16 extending into said casing 15, said shaft 16 being connected with the shaft 13 by the gearing in the casing 15.

A lower bracket 17 is rigidly secured to and projects laterally from the frame 10, and an upper bracket 18 is rigidly secured to and projects laterally from the upper end of the tube 14, the outer end of these brackets being provided with vertical bearing means which is preferably in the form of a second vertical tube 19 having its ends secured to said brackets.

Rotatable in the tube 19 and free to slide vertically therein, is the carrying and steering shaft 20 of a furrow wheel 21 which runs in the furrow last plowed and materially aids the driver of the tractor in guiding the machine, the shaft 20 being operatively connected with the axle 12 or some other suitable part of the tractor-steering means so that the furrow wheel 21 is steered with the wheel or wheels 11. The wheel 21 is within full view of the driver and by watching this wheel and keeping it against the smooth side of the furrow, the driver is enabled to properly steer the tractor.

In the construction shown, the lower end of the shaft 20 is provided with a rearwardly projecting steering arm 22 connected by a drag link or the like 23 with another steering arm 24 which is bolted or otherwise secured to the axle 12, insuring steering of the wheel 21 with the wheels 11. The freedom of the shaft 20 for vertical sliding in the tube 19, insures that this wheel shall carry none of the tractor weight and permits it to readily roll over projections or into depressions, as required.

The bracket 17, in the construction herein disclosed, is formed from a single metal bar bent between its ends to provide a contractible collar 25 and two arms 26 and 27 which diverge horizontally from said collar. The collar 25 surrounds the lower end of the tube 19 and a bolt 28 passes through the adjacent ends of the arms 26 and 27 to tightly contract said collar around said tube. The arm 26 is bolted at 29 to the front end of the tractor frame 10, and the arm 27 which extends obliquely rearward from the collar 28 for bracing purposes, is bolted at 30 to said frame.

The upper bracket 18 is preferably of the construction disclosed and includes one contractible collar 31 surrounding the upper end of the tube 19 and another contractible collar 32 surrounding the upper portion of the tube 14, said collars being secured by bolts 33 and 33' to the ends of a horizontal bar 34. These same bolts 33 and 33' serve to tightly contract the collars around the tubes. The bolt 33 also serves to connect an inclined brace bar 35 with the collar 31, the rear end of said brace bar being bolted at 36 to the tractor frame 10.

By providing the construction shown and described, the necessary rigidity is attained with a simple construction and the attachment may be easily attached or detached as required.

While the details disclosed are preferred, attention is again invited to the possibility of making variations within the scope of the invention as claimed.

I claim:—

1. In combination with a tractor having a front wheel-supported axle and steering means therefor; a furrow wheel spaced laterally from the front end of the tractor, and having a vertical steering shaft, vertical bearing means in which said steering shaft is rotatably and free to slide vertically, means rigidly mounting said bearing means upon the tractor, and means for steering said furrow wheel as the front tractor axle is turned to steer the tractor.

2. In combination with a tractor having closely related front wheels, a short axle for said wheels, a steering shaft rising from and connected with said axle, and a fixed vertical tube in which said steering shaft is mounted; an upper bracket secured to the upper portion of said tube and projecting laterally from the tractor, a lower bracket secured to the tractor frame and projecting laterally under said upper bracket, vertical bearing means carried by the outer ends of said brackets, a furrow wheel having a vertical steering shaft rotatable and vertically slidable in said bearing means, and means for steering said furrow wheel as the front tractor wheels are turned to steer the tractor.

3. In combination with a tractor having closely related front wheels, a short axle for said wheels, a steering shaft rising from and connected with said axle, and a fixed vertical tube in which said steering shaft is mounted; an upper bracket secured to the upper portion of said tube and projecting laterally from the tractor, a lower bracket secured to the tractor frame and projecting laterally under said upper bracket, a second vertical tube secured to the outer ends of said brackets, a furrow wheel having a vertical steering shaft rotatable and vertically slidable in said second tube, and means for steering said furrow wheel as the front tractor wheels are turned to steer the tractor.

4. A tractor attachment comprising a furrow wheel having a vertical steering shaft, vertical bearing means in which said steering shaft is rotatable and free to slide vertically, means for rigidly attaching said bearing means to the tractor, and steering means for said furrow wheel connected operatively with said steering shaft and having a porton for connection with a part of the tractor-steering means.

5. A tractor attachment comprising a furrow wheel having a vertical steering shaft, a vertical tube in which said steering shaft is rotatable and free to slide vertically, bracket means secured to said tube and having portions for attachment to the tractor, and steering means for said furrow wheel connected operatively with said steering shaft and having a portion for connection with part of the tractor-steering means.

6. In a tractor attachment, a vertical tube in which to mount a carrying shaft for a furrow wheel, a metal bar bent to form a contractible collar surrounding said tube and two arms diverging from said collar for attachment to the tractor, and a bolt passing through said arms for tightly contracting said collar around said tube.

7. In a tractor attachment, a vertical tube in which to mount a carrying shaft for a furrow wheel, a bracket secured to said tube and having a contractible collar to surround a steering shaft housing tube at the front end of the tractor, and means for contracting said collar.

8. In a tractor attachment a vertical tube in which to mount a carrying shaft for a furrow wheel, a contractible collar surrounding said tube, a bolt for tightly contracting said collar around said tube, a bracket arm secured to said collar by means of a bolt and having a portion for attachment to the tractor, and a brace bar secured to said collar by means of said bolt and having a portion for attachment to the tractor.

WILLIAM OLDENDORF.